US012757018B2

(12) United States Patent
Soma et al.

(10) Patent No.: US 12,757,018 B2
(45) Date of Patent: Oct. 6, 2026

(54) OPTIMIZING SECURITY IN WIRELESS NETWORKS

(71) Applicant: Charter Communications Operating, LLC, St. Louis, MO (US)

(72) Inventors: Dileep Kumar Soma, Denver, CO (US); Stephen Paul Emeott, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 296 days.

(21) Appl. No.: 18/596,029

(22) Filed: Mar. 5, 2024

(65) Prior Publication Data

US 2025/0287205 A1 Sep. 11, 2025

(51) Int. Cl.

*H04W 12/069* (2021.01)
*H04L 43/12* (2022.01)
*H04W 84/12* (2009.01)

(52) U.S. Cl.

CPC ........... *H04W 12/069* (2021.01); *H04L 43/12* (2013.01); *H04W 84/12* (2013.01)

(58) Field of Classification Search

CPC ..... H04W 84/12; H04W 12/06; H04W 48/08; H04W 8/005; H04W 28/0865; H04W 12/069; H04L 43/12

See application file for complete search history.

(56) References Cited

U.S. PATENT DOCUMENTS 8,634,556 B2 * 1/2014 Ikeda .................. H04W 12/033 370/254
2015/0245268 A1 * 8/2015 Williams .......... H04W 36/1446 370/331
2016/0113055 A1 * 4/2016 Fan ....................... H04W 76/18 370/329
2016/0286469 A1 * 9/2016 Wang .................... H04W 48/16
2021/0306944 A1 * 9/2021 Nishida ................. G06F 3/1292
2022/0338004 A1 * 10/2022 Shibata ............. H04W 12/0431
2023/0011936 A1 * 1/2023 Tachibana ............. H04L 5/0096
2023/0135980 A1 * 5/2023 Konji .................... H04W 48/08 370/329
2023/0156576 A1 * 5/2023 Xu ........................ H04W 24/02 370/328
2024/0107306 A1 * 3/2024 Yoshikawa ........... H04W 76/15
2024/0121607 A1 * 4/2024 Yoshikawa ......... H04L 41/0806
2024/0121609 A1 * 4/2024 Neipris ............... H04W 12/069
2024/0137760 A1 * 4/2024 Chen ..................... H04W 12/06

(Continued)

OTHER PUBLICATIONS

Mathy et al., 2020 IEEE Symposium on Security and Privacy, "Dragonblood: Analyzing the Dragonfly Handshake of WPA3 and EAP-pwd" (Year: 2020).*

*Primary Examiner* — Dung Hong

(74) *Attorney, Agent, or Firm* — Mendelsohn Dunleavy, P.C.; Steve Mendelsohn

(57) ABSTRACT

In a wireless (e.g., Wi-Fi 7) network, an access point (AP) that supports multiple security protocols (e.g., WPA2 and WPA3) ignores probe requests for association and connection with the AP using WPA2 from clients that also support WPA3, while granting WPA2 probe requests from WPA2-only clients and WPA3 probe requests from WPA3-capable clients, thereby preventing WPA3-capable clients from connecting using the lower-security WPA2 protocol and guiding all clients to optimize the security of their connections with the AP.

16 Claims, 4 Drawing Sheets

300

(56) References Cited

U.S. PATENT DOCUMENTS

| | | | | |
|---|---|---|---|---|
| 2024/0365124 | A1* | 10/2024 | Najmi | H04W 12/50 |
| 2024/0381188 | A1* | 11/2024 | Orr | H04W 12/041 |
| 2025/0048087 | A1* | 2/2025 | Gokturk | H04W 12/06 |
| 2025/0048109 | A1* | 2/2025 | Ouzieli | H04W 12/06 |
| 2025/0106627 | A1* | 3/2025 | Thakur | H04W 12/06 |
| 2025/0133395 | A1* | 4/2025 | Karunakaran | H04W 12/50 |
| 2025/0301320 | A1* | 9/2025 | Deng | H04W 12/06 |
| 2025/0358872 | A1* | 11/2025 | Montemurro | H04W 12/08 |

* cited by examiner

200

300

400

OPTIMIZING SECURITY IN WIRELESS NETWORKS

BACKGROUND

Field of the Disclosure

The present disclosure relates to wireless networks and, more specifically, to security protocols for wireless networks.

Description of the Related Art

This section introduces aspects that may help facilitate a better understanding of the disclosure. Accordingly, the statements of this section are to be read in this light and are not to be understood as admissions about what is prior art or what is not prior art.

With the advent of the WPA3 (Wi-Fi Protected Access 3) security protocol, only client devices that can perform the WPA3 protocol can connect to an access point (AP) if WPA3 is enabled on the AP. Downgrading to WPA2 security allows legacy and other client devices that do not support the WPA3 protocol to connect to the AP but at the cost of not leveraging the cutting-edge WPA3 protocol.

To address this problem, a WPA3-TM (WPA3 Transition Mode) security protocol has been proposed, where legacy and other client devices can choose to be connected via WPA2 security, while client devices that support the WPA3 protocol can connect via WPA3 security. Unfortunately, there are some legacy devices that are unable to connect to an AP when WPA3-TM is implemented.

SUMMARY

There is a need to provide Wi-Fi 7 capabilities with WPA3 security on newer devices while maintaining a seamless connection to legacy devices. According to certain embodiments of the disclosure, an access point is able to guide a client device to associate with the strongest security supported by the client device. For example, if the access point receives a probe request for connection using the WPA2 security protocol from a client device that also supports the WPA3 security protocol, then the access point ignores the probe request, thereby indirectly indicating to the client device to transmit a probe request for connection using the WPA3 security protocol.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms “a,” “an,” and “the,” are intended to include the plural forms as well, unless the context clearly indicates otherwise. It further will be understood that the terms “comprises,” “comprising,” “contains,” “containing,” “includes,” and/or “including,” specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
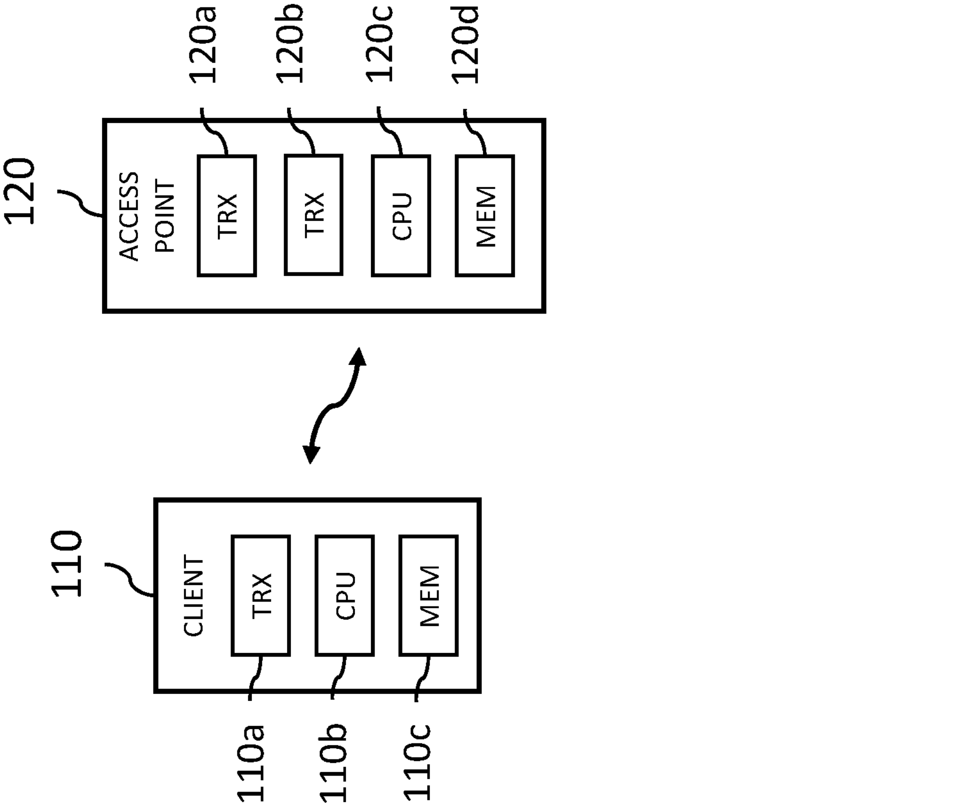
FIG. 1 is a simplified hardware block diagram of an example wireless Wi-Fi network in which a wireless device (aka client) is located within the coverage area of an access point (AP) of the network.

FIG. 1 is a simplified hardware block diagram of an example wireless Wi-Fi network 100 in which a wireless device (aka client) 110 is located within the coverage area of an access point (AP) 120 of the network 100. Those skilled in the art will understand that there may be other wireless devices (not shown) within the coverage area of the AP 120 and that the AP 120 is connected to a backend communication system (not shown) that supports communication between the AP 120 and wireless devices within its coverage area as well as between the AP 120 and the outside world. In addition, although not shown in FIG. 1, the network 100 may have additional APs as well as other backend elements that support the functionality of the network 100 for communicating with multiple other wireless devices.

As shown in FIG. 1, the client 110 includes (i) a wireless transceiver (TRX) **110*a* for transmitting wireless signals to and receiving wireless signals from the AP 120 and (ii) a processor (CPU) 110*b* for controlling the operations of the client 110, including the processing of outgoing and incoming signals to and from the AP 120 based on software code stored in the wireless device’s memory (MEM) 110*c*. Analogously, the AP 120 includes (i) a wireless transceiver 120*a* for transmitting and receiving wireless signals to and from the client 110, (ii) a backend transceiver 120*b* for transmitting and receiving (wired or wireless, depending on the implementation) signals to and from the backend communication system (not shown), and (iii) a processor 120*c* for controlling the operations of the AP 120, including the processing of outgoing and incoming signals to and from the client 110 and the backend communication system based on software code stored in the AP’s memory 120*d***.

According to certain embodiments of the disclosure, the AP 120 supports both the WPA2 security protocol and the WPA3 security protocol. As known in the art, the AP 120 periodically transmits beacons containing both the Basic Service Set Identifier (BSSID) for the WPA2 security protocol and the BSSID for the WPA3 security protocol. Depending on the particular situation, the client 110 may be (i) a wireless device that supports only the WPA2 security protocol, (ii) a wireless device that supports only the WPA3 security protocol, or (iii) a wireless device that supports both the WPA2 and WPA3 security protocols.

Figure 2:
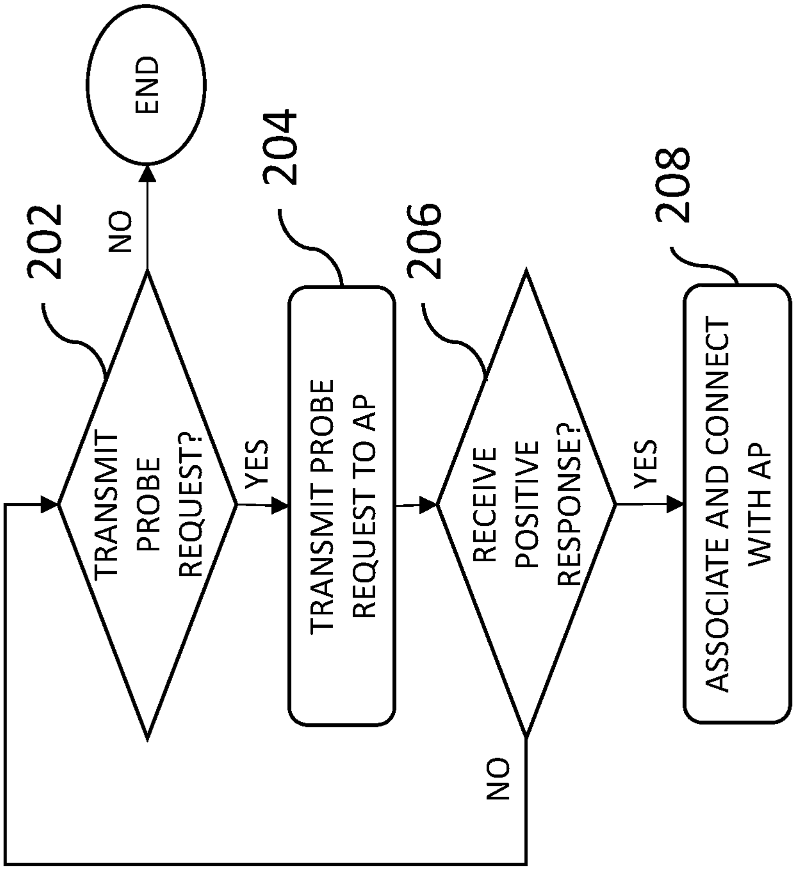
FIG. 2 is a flow diagram of the processing performed by the client of FIG. 1.

FIG. 2 is a flow diagram of the processing 200 performed by the client 110 of FIG. 1. In step 202, the client 110 determines whether to transmit a probe request to the AP 120. If not, then the processing 200 ends. Otherwise, in step 204, the client 110 transmits a probe request to associate and connect with the AP 120. Note that, in some implementations, the determination of step 202 to transmit a probe request is automatic, while, in other implementations, the determination of step 202 is based on a manual selection made by the user of client 110.

If the client 110 supports only the WPA2 security protocol, then, in step 204, the client 110 transmits a probe request to associate and connect with the AP 120 using the WPA2 security protocol. If, as determined in step 206, the client 110 receives a positive response from the AP 120, then, in step 208, the client 110 proceeds to associate and connect with the AP 120 using the WPA2 security protocol. If, as determined in step 206, the client 110 does not receive a positive response from the AP 120, then processing returns to step 202. In some implementations, this negative determination of step 206 is based on the client 110 failing to receive a positive response from the AP 120 within a specified period of time after transmitting the probe request in step 204. In this situation, since the client 110 supports only the WPA2 security protocol and since the previous probe request did not result in a positive response in step 206, then, depending on the particular implementation, the client 110 may decide, in step 202, to repeat that same WPA2 probe request in step 204 (e.g., up to a specified number of times) or end the processing 200.

If, however, the client 110 supports both the WPA2 security protocol and the WPA3 security protocol, then, in step 204, following a positive result in step 202, the client 110 transmits either (i) a probe request to associate and connect with the AP 120 using the WPA2 security protocol or (ii) a probe request to associate and connect with the AP 120 using the WPA3 security protocol. Depending on the particular implementation, the decision of step 202 as to which type of probe request to transmit in step 204 may be automatic (e.g., programmed or random) or based on a manual selection by the user of the client 110.

If, as determined in step 206, the client 110 receives a positive response from the AP 120, then, in step 208, the client 110 proceeds to associate and connect with the AP 120 using the corresponding security protocol identified in the probe request of step 204. If, as determined in step 206, the client 110 does not receive a positive response from the AP 120, then processing returns to step 202. Here, too, in some implementations, this negative determination of step 206 is based on the client 110 failing to receive a positive response from the AP 120 within a specified period of time after transmitting the probe request in step 204. In this situation, since the client 110 supports both the WPA2 security protocol and the WPA3 security protocol and since the previous probe request did not result in a positive response in step 206, then, depending on the particular implementation, the client 110 may decide, in step 202, to repeat that same probe request in step 204 (e.g., up to a specified number of times) or transmit a probe request identifying the other supported security protocol (i.e., if the previous probe request identified WPA2, then the next probe request identifies WPA3, and vice versa) or end the processing 200.

Figure 3:
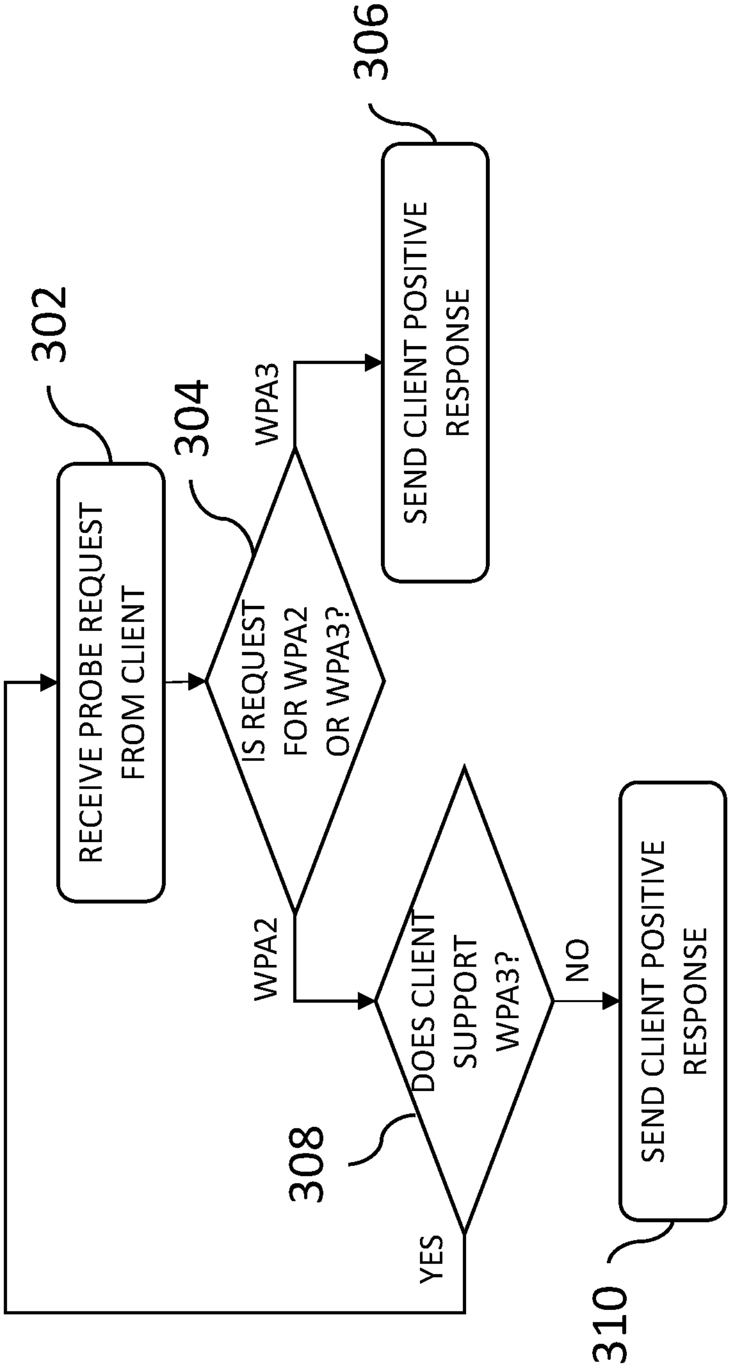
FIG. 3 is a flow diagram of the processing performed by the AP of FIG. 1, which supports both the WPA2 and the WPA3 security protocols.

FIG. 3 is a flow diagram of the processing 300 performed by the AP 120 of FIG. 1, which supports both the WPA2 and the WPA3 security protocols. In step 302, the AP 120 receives a probe request from the client 110. In step 304, the AP 120 determines whether the probe request identifies the WPA2 security protocol or the WPA3 security protocol. If the AP 120 determines in step 304 that the probe request identifies the WPA3 security protocol, then the AP 120 knows that the client 110 supports the WPA3 security protocol. In that case, in step 306, the AP 120 sends a positive response to the client 110, thereby authorizing the WPA3-capable client 110 to associate and connect with the AP 120 using the WPA3 security protocol (as in step 208 of FIG. 2).

If, however, the AP 120 determines in step 304 that the probe request identifies the WPA2 security protocol, then, in step 308, the AP 120 determines whether or not the client 110 supports the WPA3 security protocol. If the probe request contains IEEE 801.11be Extremely High Throughput (EHT) elements associated with Wi-Fi 7, then the AP 120 determines that the client 110 supports the WPA3 security protocol. If the AP 120 determines in step 308 that the client 110 does not support the WPA3 security protocol, then, in step 310, the AP 120 transmits a positive response to the client 110, thereby authorizing the WPA2-capable client 110 to associate and connect with the AP 120 using the WPA2 security protocol (as in step 208 of FIG. 2).

If, however, the AP 120 determines in step 308 that the client 110 does support the WPA3 security protocol, then the AP 120 knows that the WPA3-capable client has transmitted a WPA2 probe request. In that case, the WPA3-capable AP 120 does not want to allow the WPA3-capable client 110 to connect to the AP 120 using the less-secure WPA2 security protocol. As such, the AP 120 does not transmit any response to the client 110, and instead the processing 300 returns to step 302 for the AP 120 to await the arrival of another probe request, if any, from the client 110. By failing to transmit a response to the client 110, the AP 120 indirectly indicates to the client 110 (or to the user of the client 110) the need to transmit a WPA3 probe request.

Based on the processing 300 of FIG. 3, the AP 120 essentially guides WPA3-capable clients 110 (or the users of such clients 110) to optimize the security of the clients' communications with the AP 120, while allowing other clients 110 that support only the WPA2 security protocol to associate and connect with the AP 120 using the WPA2 security protocol.

Figure 4:
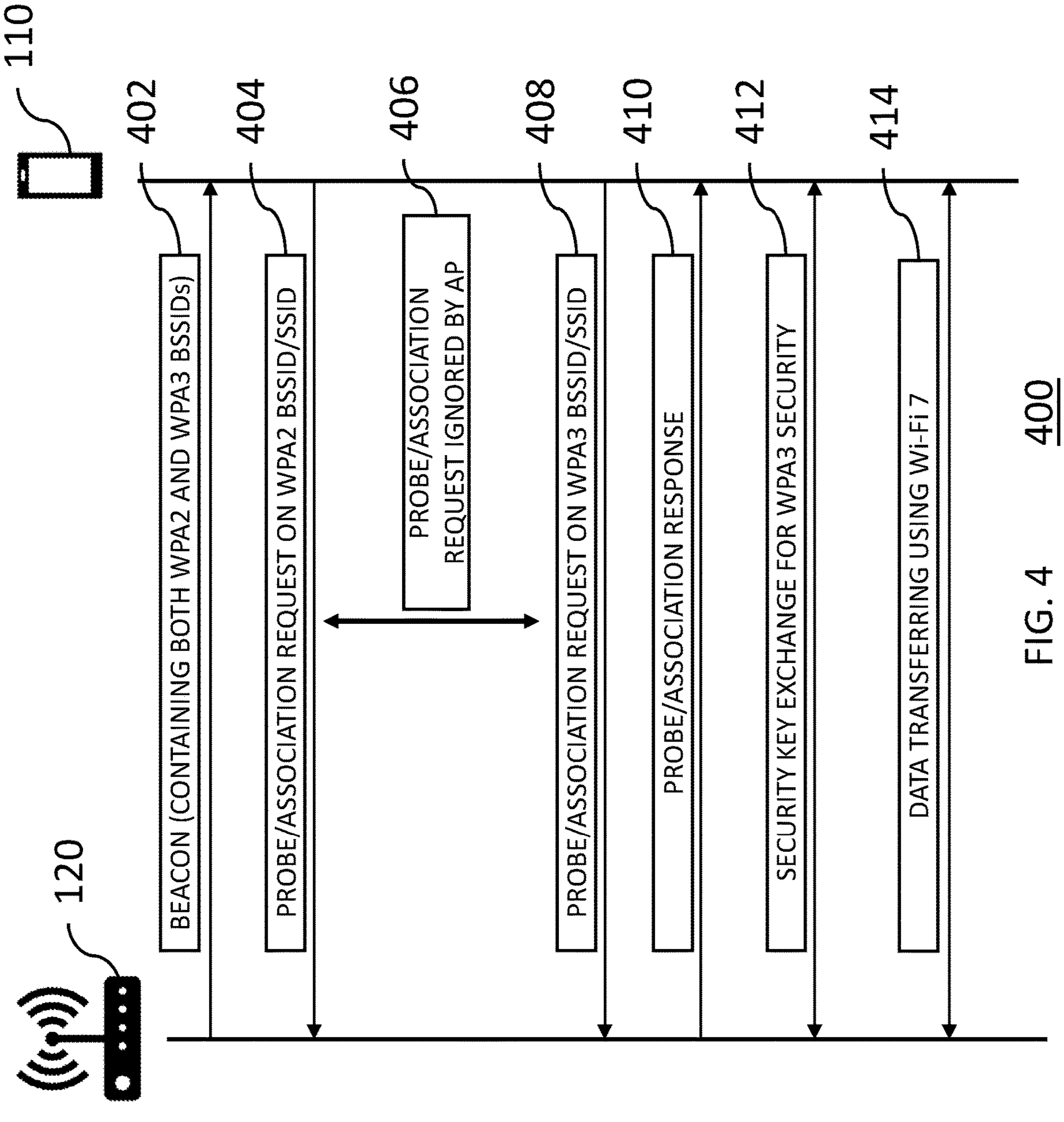
FIG. 4 is a signal flow diagram of the processing performed by the client and the AP of FIG. 1 for a situation in which both the client and the AP support both the WPA2 and the WPA3 security protocols.

FIG. 4 is a signal flow diagram of the processing 400 performed by the client 110 and the AP 120 of FIG. 1 for a situation in which both the client 110 and the AP 120 support both the WPA2 and the WPA3 security protocols. In step 402, the AP 120 transmits—and the client 110 receives—a beacon containing the BSSIDs for both protocols.

In step 404, the client 110 transmits—and the AP 120 receives—a probe request using the WPA2 BSSID, which the AP 120 ignores in step 406.

In step 408, the client 110 transmits—and the AP 120 receives—a probe request using the WPA3 BSSID. In response, in step 410, the AP 120 transmits—and the client 110 receives—a positive response. In response, in step 412, the client 110 associates and connects with the AP 120 by exchanging security keys for WPA3 security, and, in step 414, the client 110 and the AP 120 transfer data using Wi-Fi 7.

In the scenario of FIG. 4, the WPA3-capable client 110 is guided by the AP 120 to optimize the security of its association and connection with the AP 120.

Although the disclosure has been described in the context of an AP that, under certain circumstances, fails to transmit a response to a client's probe request, in other implementations, an AP may explicitly transmit a negative acknowledgement (NACK) message to the client under those same circumstances.

Although the disclosure has been described in the context of clients and APs that support two different security protocols that provide two different levels of security, namely the WPA2 security protocol and the more-secure WPA3 security protocol, those skilled in the art will understand that embodiments of the disclosure may be implemented in the context of different pairs of security protocols, such as (without limitation) WPA3 and WPA4, as well as embodiments in the context of three or more different security protocols, such as (without limitation) WPA2, WPA3, and WPA4.

Although the disclosure has been described in the context of Wi-Fi 7 networks, those skilled in the art will understand that the disclosure can be implemented in the context of other Wi-Fi networks and also in the context of non-Wi-Fi wireless networks.

In certain embodiments, the present disclosure is an access point for a wireless network, wherein the access point supports at least a first security protocol and a higher-security, second security protocol. The access point comprises a memory and at least one processor, coupled to the memory and operative to receive a first probe request for the first security protocol from a first client device that supports the second security protocol; determine that (i) the first probe request is for the first security protocol and (ii) the first client device supports the second security protocol; and fail to transmit a positive response to the first client device based on determining that (i) the first probe request is for the first security protocol and (ii) the first client device supports the second security protocol.

In at least some of the above embodiments, the access point is further adapted to receive a second probe request for the first security protocol from a second client device that supports only the first security protocol; determine that (i) the second probe request is for the first security protocol and (ii) the second client device supports only the first security protocol; and transmit a positive response to the second client device based on determining that (i) the second probe request is for the first security protocol and (ii) the second client device supports only the first security protocol.

In at least some of the above embodiments, the access point is further adapted to receive a third probe request for the second security protocol from a third client device that supports the second security protocol; determine that (i) the third probe request is for the second security protocol and (ii) the third client device supports the second security protocol; and transmit a positive response to the second client device based on determining that (i) the third probe request is for the second security protocol and (ii) the third client device supports the second security protocol.

In at least some of the above embodiments, the access point is further adapted to receive a second probe request for the second security protocol from the first client device; determine that (i) the second probe request is for the second security protocol and (ii) the first client device supports the second security protocol; and transmit a positive response to the first client device based on determining that (i) the second probe request is for the second security protocol and (ii) the first client device supports the second security protocol.

In at least some of the above embodiments, the access point failing to transmit a positive response to the first client device comprises the access point not transmitting any response to the first client device.

In at least some of the above embodiments, the access point failing to transmit a positive response to the first client device comprises the access point transmitting a negative response to the first client device.

In at least some of the above embodiments, the wireless network is a Wi-Fi 7 network; the first security protocol is WPA2 security protocol; and the second security protocol is WPA3 security protocol.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for an access point of a wireless network, wherein the access point supports at least a first security protocol and a higher-security, second security protocol, the method comprising the access point:

receiving a first probe request from a first client device;

positively determining that (i) the first probe request is for the first security protocol and (ii) the first client device supports the second security protocol, wherein the first probe request for the first security protocol explicitly identifies that the first client device supports the higher-security, second security protocol; and failing to transmit a positive response to the first client device based on determining that (i) the first probe request is for the first security protocol and (ii) the first client device supports the second security protocol, wherein failing to transmit a positive response to the first client device comprises either (i) not transmitting any response to the first client device or (ii) transmitting a negative response to the first client device.

2. The method of claim 1, the method further comprising:

receiving a second probe request from a second client device;

positively determining that (i) the second probe request is for the first security protocol and (ii) the second client device supports only the first security protocol; and transmitting a positive response to the second client device based on determining that (i) the second probe request is for the first security protocol and (ii) the second client device supports only the first security protocol.

3. The method of claim 1, the method further comprising:

receiving a third probe request from a third client device;

positively determining that (i) the third probe request is for the second security protocol and (ii) the third client device supports the second security protocol; and transmitting a positive response to the second client device based on determining that (i) the third probe request is for the second security protocol and (ii) the third client device supports the second security protocol.

4. The method of claim 1, the method further comprising:

receiving a second probe request from the first client device;

positively determining that the second probe request is for the second security protocol; and transmitting a positive response to the first client device based on determining that (i) the second probe request is for the second security protocol and (ii) the first client device supports the second security protocol.

5. The method of claim 1, wherein failing to transmit a positive response to the first client device comprises not transmitting any response to the first client device.

6. The method of claim 1, wherein failing to transmit a positive response to the first client device comprises transmitting a negative response to the first client device.

7. The method of claim 1, wherein:

the wireless network is a Wi-Fi 7 network;

the first security protocol is WPA2 security protocol; and the second security protocol is WPA3 security protocol.

8. The method of claim 7, wherein the method comprising determining that the first client device supports the WPA3 security protocol by determining that the first probe request contains IEEE 801.11be Extremely High Throughput (EHT) elements associated with Wi-Fi 7.

9. An access point for a wireless network, wherein the access point supports at least a first security protocol and a higher-security, second security protocol, the access point comprising:

a memory; and at least one processor, coupled to the memory and operative to:

receive a first probe request from a first client device;

positively determine that (i) the first probe request is for the first security protocol and (ii) the first client device supports the second security protocol, wherein the first probe request for the first security protocol explicitly identifies that the first client device supports the higher-security, second security protocol; and fail to transmit a positive response to the first client device based on determining that (i) the first probe request is for the first security protocol and (ii) the first client device supports the second security protocol, wherein the access point failing to transmit a positive response to the first client device comprises either (i) the access point not transmitting any response to the first client device or (ii) the access point transmitting a negative response to the first client device.

10. The access point of claim 9, wherein the access point is further adapted to:

receive a second probe request from a second client device;

positively determine that (i) the second probe request is for the first security protocol and (ii) the second client device supports only the first security protocol; and transmit a positive response to the second client device based on determining that (i) the second probe request is for the first security protocol and (ii) the second client device supports only the first security protocol.

11. The access point of claim 9, wherein the access point is further adapted to:

receive a third probe request from a third client device;

positively determine that (i) the third probe request is for the second security protocol and (ii) the third client device supports the second security protocol; and transmit a positive response to the second client device based on determining that (i) the third probe request is for the second security protocol and (ii) the third client device supports the second security protocol.

12. The access point of claim 9, wherein the access point is further adapted to:

receive a second probe request from the first client device;

positively determine that the second probe request is for the second security protocol; and transmit a positive response to the first client device based on determining that (i) the second probe request is for the second security protocol and (ii) the first client device supports the second security protocol.

13. The access point of claim 9, wherein the access point failing to transmit a positive response to the first client device comprises the access point not transmitting any response to the first client device.

14. The access point of claim 9, wherein the access point failing to transmit a positive response to the first client device comprises the access point transmitting a negative response to the first client device.

15. The access point of claim 9, wherein:

the wireless network is a Wi-Fi 7 network;

the first security protocol is WPA2 security protocol; and the second security protocol is WPA3 security protocol.

16. The access point of claim 15, wherein the access point is configured to determine that the first client device supports the WPA3 security protocol by determining that the first probe request contains IEEE 801.11be Extremely High Throughput (EHT) elements associated with Wi-Fi 7.

* * * * *